US008592026B2

(12) United States Patent
Arévalo Rodríguez et al.

(10) Patent No.: US 8,592,026 B2
(45) Date of Patent: Nov. 26, 2013

(54) AIRCRAFT FUSELAGE FRAME OF COMPOSITE MATERIAL WITH STABILISING RIBS

(75) Inventors: Elena Arévalo Rodríguez, Madrid (ES); Francisco José Cruz Dominguez, Madrid (ES)

(73) Assignee: Airbus Operations S.L., Madrid (ES)

( * ) Notice: Subject to any disclaimer, the term of this patent is extended or adjusted under 35 U.S.C. 154(b) by 407 days.

(21) Appl. No.: 12/883,269

(22) Filed: Sep. 16, 2010

(65) Prior Publication Data

US 2011/0159248 A1 Jun. 30, 2011

(30) Foreign Application Priority Data

Dec. 30, 2009 (ES) .................................. 200931308

(51) Int. Cl.
*B32B 1/00* (2006.01)
*B32B 3/00* (2006.01)
(52) U.S. Cl.
USPC ............................. 428/174; 428/119; 428/120
(58) Field of Classification Search
USPC .......... 428/174, 178, 188, 119, 120; 244/119, 244/120; 52/831; 156/242; 29/525.01
See application file for complete search history.

(56) References Cited

U.S. PATENT DOCUMENTS

2011/0095130 A1* 4/2011 Luettig ......................... 244/119

FOREIGN PATENT DOCUMENTS

WO WO 2009146958 A1 * 12/2009

\* cited by examiner

*Primary Examiner* — Catherine A Simone
(74) *Attorney, Agent, or Firm* — Ladas & Parry LLP

(57) ABSTRACT

Aircraft fuselage frame in composite material with stabilising ribs which, in at least a first sector (31), comprises a frame (9) with an omega-shaped cross-section (11) formed by a top element (23), two webs (25, 25'), two feet (27, 27') which includes at least one internal rib (41) formed by a top element (43) joined to the top element (23) of the frame (9), a web (45), two flanges (49, 49') joined to the webs (25, 25') of the frame (9) and a foot (47) aligned with the feet (27, 27') of the frame (9). The invention also relates to a manufacturing procedure for the first sector (31) of the frame with stabilised web (10) comprising steps for: a) providing a frame (9) and at least one internal rib (41) with the configurations indicated; b) joining at least said internal rib (41) to the frame (9).

23 Claims, 2 Drawing Sheets

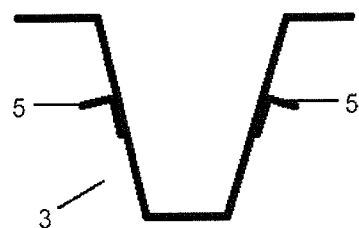
FIG. 1
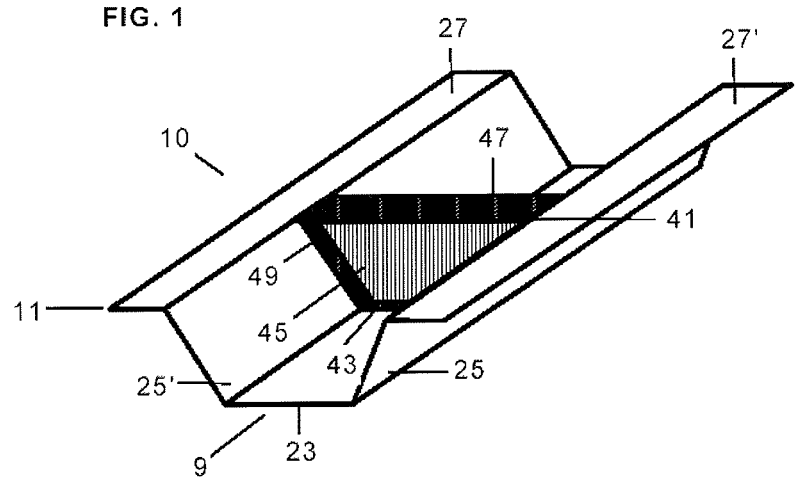
FIG. 2
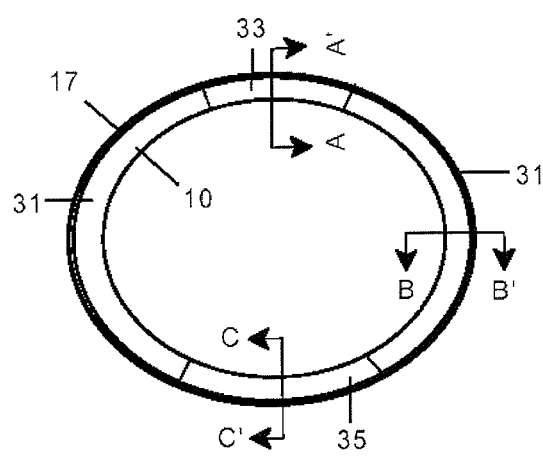
FIG. 3
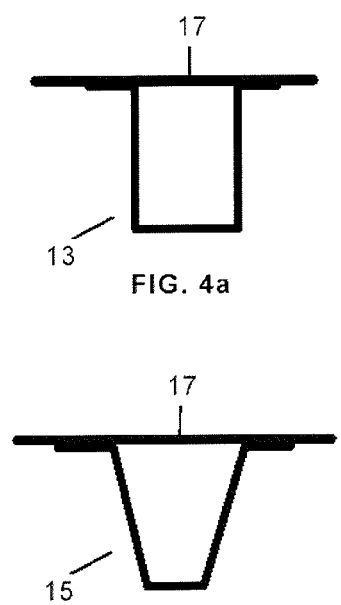
FIG. 4a
FIG. 4b

AIRCRAFT FUSELAGE FRAME OF COMPOSITE MATERIAL WITH STABILISING RIBS

FIELD OF THE INVENTION

The present invention relates to aircraft fuselage frames made from composite material, in particular to frames with stabilised web.

BACKGROUND OF THE INVENTION

Loading frames, in addition to shaping and stiffening the fuselage of an aircraft, are structural elements designed to withstand and transfer loads from other structural elements in the aircraft, such as the wings and stabilisers.

Traditionally, loading frames have been made from metal material and have had various cross sections, with the most common being C-, I- and J-shaped, and which, by means of machining processes, form a framework of stiffeners which stabilise the webs in the frame.

In today's aeronautical industry, the strength-weight ratio is of supreme importance which means that there is a demand for frames made from, or optimised using, composite materials, mainly carbon fibre, rather than metal frames.

In the case of loading frames it is difficult to compete with machined metal frames since, due to the large amounts of different types of stress they have to withstand, alternative frames in composite materials usually pose diverse manufacturing problems due to their rather complex design. In any event, several solutions in this area are already known, such as those described in patent applications WO 2008/092970, US 2009/0026315 and WO 2009/030731.

One of the aforementioned problems relates to attempting to produce a frame design with stabilised webs which would enable weight to be optimised. Although several solutions are already known for forming frames, none are available for loading frames in spite of the current demand for such frames in the aeronautical industry.

The invention is aimed at meeting this demand.

SUMMARY OF THE INVENTION

An object of the invention is to provide an aircraft fuselage frame with stabilised web made from composite material configured so that the strength-weight ratio is optimised not only in the frame itself but also in the skin.

Another object of the invention is to provide an aircraft fuselage frame with stabilised web whose configuration facilitates its manufacture.

In a first aspect, these and other objects are met by means of a frame with stabilised web in composite material which, in at least a first sector, comprises a frame with an omega-shaped cross-section formed by a top element, two webs and two feet and includes at least one internal rib formed by a top element joined to the top element of the frame, a web, two flanges joined to the webs of the frame and a foot aligned with the feet of the frame.

In a preferred embodiment, the frame with stabilised web has the aforementioned configuration along its entire length. Optimised frames that require stabilised webs along their entire length are thus obtained.

In another preferred embodiment, the frame with stabilised web can comprise a plurality of sectors with one of them having the aforementioned configuration and the others having a different configuration. Optimised frames for areas with differing requirements are thus obtained.

In a second aspect, these and other objects are met by means of a manufacturing procedure for the aforementioned first sector in the frame with stabilised web which comprises steps for:
providing a frame and at least one internal rib with the aforementioned configurations
joining at least said internal rib to the frame.

In a preferred embodiment the manufacturing procedure for the aforementioned first sector in the frame with stabilised web comprises the following steps:
manufacturing and curing, preferably using an RTM process, of one or more internal preforms of internal ribs (it is also possible to do this using a prepreg material and appropriate tooling)
manufacturing of a preform of the frame, preferably using a hot forming process and prepreg material.
co-bonding of said preforms in a curing cycle in an autoclave.

A very efficient procedure is thus obtained for the manufacture of frames with stabilised web since, on the one hand, a high degree of dimensional accuracy can be obtained in the internal ribs which represents a major advantage particularly in the case of loading frames in which internal ribs have different dimensions in distinct zones and, on the other hand, it is an efficient procedure for manufacturing said loading frames (which are subject to large stresses) since, as the preform frame is made from prepreg material, it improves the mechanical characteristics of the frame because the mechanical characteristics of said material are better than those of RTM material.

In another preferred embodiment, the manufacturing procedure for the aforementioned first sector of the frame with stabilised web comprises the following steps:
manufacturing and curing of a preform of the frame preferably using an RTM process (it is also possible to do this using prepreg material and appropriate tooling)
manufacturing of one or more preforms of internal ribs, preferably using a hot forming process and prepreg material.
co-bonding of said preforms in a curing cycle in an autoclave.

A very efficient procedure is thus obtained for the manufacture of frames with stabilised web since, on the one hand, a high degree of dimensional accuracy is obtained in the manufacture of the frame using RTM, which represents a major advantage particularly in the case of loading frames in which said frame has different dimensions in distinct zones and, on the other hand, bearing in mind the mechanical characteristics of RTM material, it is an efficient procedure for the manufacture of sectors of the frame that are subject to moderate loading stresses.

In another preferred embodiment, the manufacturing procedure for the aforementioned first sector of the frame with stabilised web comprises the following steps:
manufacturing of preforms of the frame and the internal ribs made from prepreg material.
co-curing of said preforms in a curing cycle in an autoclave.

An efficient procedure is thus obtained for the manufacture of sectors of the frame with stabilised web that are subject to large loading stresses and free from any large dimensional variations.

In another preferred embodiment, the manufacturing procedure for the aforementioned first sector of the frame with stabilised web comprises the following steps:
manufacturing of dry preforms of the frame and the internal ribs.

co-curing of said preforms using an RTM process.

An efficient procedure is thus obtained for the manufacture of sectors of the frame with stabilised web that are subject to moderate loading stresses and large dimensional variations.

In another preferred embodiment, the manufacturing procedure for the aforementioned first sector of the frame with stabilised web comprises the following steps:

manufacturing and separate curing of the frame and the internal ribs joining of the ribs to the frame using adhesives.

An efficient procedure is thus obtained for the manufacture of sectors of the frame with stabilised web that are subject to small loading stresses.

In another preferred embodiment, the manufacturing procedure for the aforementioned first sector of the frame with stabilised web comprises the following steps:

manufacturing and separate curing of the frame and the internal ribs.

joining of the ribs to the frame using rivets.

An efficient procedure is thus obtained for the manufacture of sectors of the frame with stabilised web that are subject to small loading stresses.

Further features and advantages of the invention will emerge from the detailed description which follows of an examplary embodiment of the object of the invention with reference to the accompanying drawings.

BRIEF DESCRIPTION OF THE DRAWINGS

FIG. 1 shows the conventional solution for the stabilisation of the web of a frame made from composite material and with an omega-shaped cross section.

FIG. 2 shows a schematic perspective view of a sector of a frame with stabilised web according to the invention.

FIG. 3 shows a schematic perspective view of a sector of a frame with stabilised web according to the invention structured in a plurality of sectors of varying configurations.

FIGS. 4a and 4b show sections of different sectors of the frame with stabilised web in FIG. 3.

DETAILED DESCRIPTION OF THE INVENTION

Figure 5:
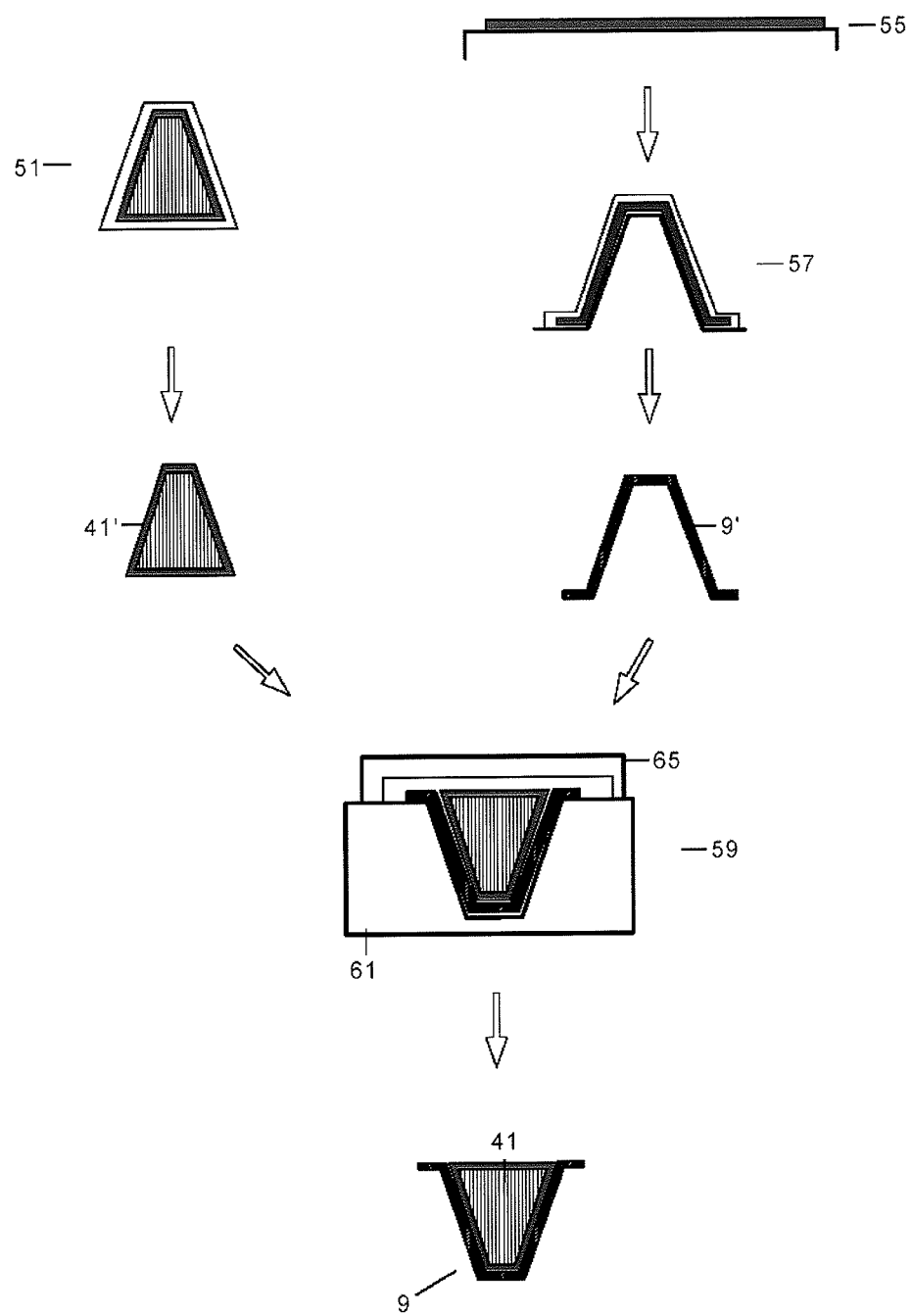
FIG. 5 schematically shows one of the manufacturing processes of a frame with stabilised web according to the invention.

Patent application WO 2008/092970 describes a loading frame made from composite material with a closed cross-section which may be pi- or omega-shaped and which comprises three elements: two side elements and a base element each made using an appropriate laminate to withstand the loads to which they are going to be subjected.

Whereas in a metal frame of similar configuration it would be easy to machine a plurality of stiffening elements, this is not the case in a frame made from composite material. In a frame 3 of this type, and as shown in FIG. 1, the conventional solution in composite material to stabilise its web and optimise its weight would be to join two L-shaped elements 5 to its web.

The alternative according to the invention is a frame with stabilised web 10 which, in at least one of its sectors, and as shown in FIG. 2, comprises a frame 9 whose cross-section 11 is a closed omega-shaped cross section formed by a top element 23, two webs 25, 25' and two feet 27, 27', and one or more internal stabilising ribs 41 formed by a top element 43, a web 45, a foot 47 and two flanges 49, 49'.

The top element 43 and the flanges 49, 49' of the rib are orientated in parallel and joined to the top element 23 and webs 25, 25' of the frame 9 respectively and the foot 47 of ribs 41, orientated in parallel to the feet 27, 27' of the frame 9, will be joined to the skin 17 of the fuselage.

The rib 41 therefore has the dual function of stiffening both the web and the top element of the frame 9 and the skin 17 of the fuselage thus optimising the weight. The frame with stabilised web 10 according to the invention therefore provides an additional stabilising factor for the skin 17 of the fuselage which is not present in the known frames in the prior art.

Similarly, ribs 41 can be used to be joined to and stabilise any T-shaped stringers of the fuselage 17 which intersect with the stabilised frame 10 in the vicinity of ribs 41.

The feet 27, 27', top element 23 and webs 25, 25' of the frame 9 and the foot 47, top element 43, web 45 and flanges 49, 49' comprise layers of composite material arranged at $0°+/-45°$ and $90°$. The composite material may be either carbon fibre or glass fibre with thermostable or thermoplastic resin.

Unidirectional fibre reinforcements at $0°$ are also included in the feet 27, 27' and in the top element 23 of the frame 9 in the same material or in a compatible material longitudinally and continuously extended along the entire frame. The material in the reinforcements has a high modulus of elasticity rendering the feet 27, 27' and the top element 23 highly rigid.

Webs 25, 25' of the frame 9 may also comprise unidirectional fibre reinforcements in the same material or in a compatible material in any direction. The reinforcements of the webs 25, 25' of the frame 9 may be continuous along the entire frame 9 or localised, in accordance with the stresses to which the frame is subjected. This means that webs 25, 25' are thus capable of withstanding loads that are much larger than if it comprised exclusively fabrics at $0°+/-45°$ and $90°$.

By adding to the frame 9 the internal ribs 41, the thicknesses of its webs 25, 25' may be reduced to obtain a closed cross-section whose geometry and thickness can be varied, thus optimising its weight. Similarly, the skin 17 is also stiffened by the internal ribs 41 since these are also joined to it, so that its weight also can be optimised.

The lengths of webs 25, 25' of the frame 9 between internal ribs 41 must have holes, not shown in FIG. 2, which, on the one hand are necessary to ensure access to the inside of the stabilised frame 10 in order to be able to rivet the feet 47 of the internal ribs 41 to the skin 17, and to be able to inspect said internal ribs 41 and which, on the other hand, if they are stamped, also contribute to weight reduction.

In a preferred embodiment of the invention, the entire frame with stabilised web 10 joined to the skin 17 of the fuselage is a frame 9 with the cross-section 11 shown in FIG. 2 with internal ribs 41.

In another preferred embodiment of the invention shown in FIGS. 3 and 4, the frame with stabilised web 10, joined to the skin 17 of the fuselage, may have the aforementioned configurations in the first sector 31 (along plane B-B'), different cross-sections in other sectors, such as a cross-section 13 (along the plane A-A') which is pi-shaped (shown in FIG. 4a) without internal ribs in the second sector 33, or a cross-section 15 (along the plane C-C') in the shape of a single omega without any internal ribs (shown in FIG. 4b) in the third sector 35.

The second sector 33 corresponds to a sector of the frame with stabilised web 10 with local loading inputs via fittings which are joined to the webs of the frame. A cross-section with a stiffening element in this sector is therefore not necessary and the frame can be simply formed using a pi-shaped element with a closed cross-section (it may also have the shape of a single omega) since the presence of the fittings in this area obviate the need for the webs to be stabilised.

The third sector 35 corresponds to a sector in the frame which is subject to small stresses and hence a cross-section 15 in the shape of a single omega may be appropriate.

Between the aforementioned sectors there are obviously transition areas between differently shaped cross-sections.

In any of its embodiments, the frame with stabilised web 10 according to the invention can be used in cross sections of the fuselage which are circular, ellipsoid or rectangular in shape or have a different shape.

We will now describe, in accordance with FIG. 5, a first variation embodiment for the procedure according to the invention to make a frame with stabilised web 10 with at least a first sector 31 with one or more stabilising ribs 41 as shown in FIG. 2.

At a first stage 51 preforms 41' of the internal ribs 41 would be made and then cured using an RTM, Resin Transfer Moulding, process (this can also be done using prepreg material and appropriate tooling). As is well known, in this process an enclosed flow and pressurised mould is used into which dry preforms are placed and then resin is injected.

At a second stage a preform 9' of the frame 9 would be made with the cross-section 11 using a hot forming process including a first step 55 comprising stacking prepreg material and a second stage 57 comprising hot forming.

At a third stage 59 the preforms 41' and 9' would be co-bonded and the part would be consolidated in a curing cycle in an autoclave. As can be seen in FIG. 5, this process requires on the one hand a first external device 61 on top of which the preform 9' would be rested and on the other hand several internal devices (not shown in FIG. 5) between the preforms 41' and a second external device 65 to ensure suitable compacting of the preform 9'.

In a second variation embodiment of a procedure according to the invention to make a frame with stabilised web 10 with at least a first sector 31 with one or more stabilising ribs 41, a dry preform 9' of the frame 9 with the cross-section 11 would be made which would be cured using an RTM (Resin Transfer Moulding) process (this can also be done using prepreg material and appropriate tooling). A plurality of preforms 41' of the internal ribs 41 would then be made using a hot forming process and finally the preforms 41' and 9' would be co-bonded and the part would be consolidated in a curing cycle in an autoclave.

In a third variation embodiment of a procedure according to the invention to make a frame with stabilised web 10 with at least a first sector 31 with one or more stabilising ribs 41, preforms 9', 41' of the frame 9 and of the ribs 41 would be made separately from prepreg material which, following a hot forming process and after being duly arranged in appropriate tooling, would be co-cured in a curing cycle in an autoclave.

In a fourth variation embodiment of a procedure according to the invention to make a frame with stabilised web 10 with at least a first sector 31 with one or more stabilising ribs 41, dry preforms 9', 41' of the frame 9 and of the ribs 41 would be made separately and co-cured using an RTM process.

In a fifth variation embodiment of a procedure according to the invention to make a frame with stabilised web 10 with at least a first sector 31 with one or more stabilising ribs 41, the frame 9 and the ribs 41 would be made and cured separately and joined using adhesives.

In a sixth variation embodiment of a procedure according to the invention to make a frame with stabilised web 10 with at least a first sector 31 with one or more stabilising ribs 41, the frame 9 and the ribs 41 would be made and cured separately and joined using rivets.

Although this invention has been described solely in relation to the preferred embodiments, these are non-limiting examples and it is obvious that modifications may be made without departing from the scope of the invention with the following claims taking precedence.

The invention claimed is:

1. A load frame linked to load-imparting structural elements and capable of withstanding and transferring the loads imparted thereby, wherein said load frame comprises a stabilised web in composite material which in at least a first sector of the frame comprises a frame with an omega-shaped cross-section formed by a top element, two webs, two feet, wherein said frame includes at least one internal rib formed by a top element joined to the top element of the frame, a web, two flanges joined to the webs of the frame and a foot aligned with the feet of the frame.

2. The load frame with stabilised web according to claim 1, wherein said first sector extends along its entire length.

3. The load frame with stabilised web according to claim 1, wherein in addition to the first sector it comprises a second sector in the area intended for the receiving of external loads, whose cross-section is a closed section.

4. The load frame with stabilised web according to claim 3, wherein said second sector has a pi-shaped cross-section.

5. The load frame with stabilised web according to claim 3, wherein said second sector has an omega-shaped cross-section.

6. The load frame with stabilised web according to claim 1, wherein in addition to the first sector it comprises a third sector which has an omega-shaped cross-section.

7. Manufacturing procedure for a frame with stabilised web (10) according to claim 1, characterised in that the manufacture of the first sector (31) comprises steps for:
 providing a frame (9) and at least one internal rib (41) with the aforementioned configurations;
 joining at least said internal rib (41) to the frame (9).

8. Manufacturing procedure for a frame with stabilised web (10) according to claim 7, characterised in that the manufacture of the first sector (31) comprises the following steps:
 manufacturing and curing of one or more preforms (41') of ribs (41);
 manufacturing of a preform (9') of the frame (9);
 co-bonding of said preforms (41', 9') in a curing cycle in an autoclave.

9. Manufacturing procedure for a frame with stabilised web (10) according to claim 8, characterised in that stage a) is undertaken using an RTM process.

10. Manufacturing procedure for a frame with stabilised web (10) according to claim 8, characterised in that stage b) is undertaken using prepreg material and a hot forming process.

11. Manufacturing procedure for a frame with stabilised web (10) according to claim 7, characterised in that the manufacture of the first sector (31) comprises the following steps:
 manufacturing of one or more preforms (41') of ribs (41);
 manufacturing and curing of a preform (9') of the frame (9);
 co-bonding of said preforms (41', 9') in a curing cycle in an autoclave.

12. Manufacturing procedure for a frame with stabilised web (10) according to claim 11, characterised in that stage a) is undertaken using prepreg material and a hot forming process.

13. Manufacturing procedure for a frame with stabilised web (10) according to claim 11, characterised in that stage b) is undertaken using an RTM process.

14. Manufacturing procedure for a frame with stabilised web (10) according to claim 7, characterised in that the manufacture of the first sector (31) comprises the following steps:
 manufacturing of one or more preforms (41') of ribs (41) in prepreg material;

manufacturing of a preform (9') of the frame (9) in prepreg material;

co-curing of said preforms (41', 9') in a curing cycle in an autoclave.

15. Manufacturing procedure for a frame with stabilised web (10) according to claim 7, characterised in that the manufacture of the first sector (31) comprises the following steps:

manufacturing of one or more dry preforms (41') of ribs (41);

manufacturing of a dry preform (9') of the frame (9);

co-curing of said preforms (41', 9') using an RTM process.

16. Manufacturing procedure for a frame with stabilised web (10) according to claim 7, characterised in that the manufacture of the first sector (31) comprises the following steps:

manufacturing and curing of one or more ribs (41);

manufacturing and curing of the frame (9);

joining of the ribs (41) to the frame (9) using adhesives.

17. Manufacturing procedure for a frame with stabilised web (10) according to claim 7, characterised in that the manufacture of the first sector (31) comprises the following steps:

manufacturing and curing of one or more ribs (41);

manufacturing and curing of the frame (9);

joining of the ribs (41) to the frame (9) using rivets.

18. An aircraft fuselage comprising a load frame wherein said load frame has a stabilised web which in at least a first sector of the frame comprises a frame with an omega-shaped cross-section formed by a top element, two webs, two feet, wherein said frame includes at least one internal rib formed by a top element joined to the top element of the frame, a web, two flanges joined to the webs of the frame and a foot aligned with the feet of the frame.

19. An aircraft fuselage according to claim 18, wherein said first sector of the load frame extends along its entire length.

20. An aircraft fuselage according to claim 18, wherein in addition to the first sector the load frame comprises a second sector in the area intended for the receiving of external loads, whose cross-section is a closed section.

21. An aircraft fuselage according to claim 20, wherein said second sector has a pi-shaped cross-section.

22. An aircraft fuselage according to claim 20, wherein said second sector has an omega-shaped cross-section.

23. An aircraft fuselage according to claim 18, wherein in addition to the first sector the load frame comprises a third sector which has an omega-shaped cross-section.

* * * * *